United States Patent [19]

Wreath et al.

[11] Patent Number: 4,613,415

[45] Date of Patent: Sep. 23, 1986

[54] ELECTROLYTIC CHLORINE AND ALKALI GENERATOR FOR SWIMMING POOLS AND METHOD

[75] Inventors: Clarence F. Wreath, Tarpon Springs; Robert D. Keller, Jr., Dunedin, both of Fla.

[73] Assignee: Sophisticated Systems, Inc., Palm Harbor, Fla.

[21] Appl. No.: 642,183

[22] Filed: Aug. 17, 1984

[51] Int. Cl.$^4$ .............................................. C25B 1/34
[52] U.S. Cl. ...................................... 204/98; 204/128; 204/263; 204/264; 204/266
[58] Field of Search .................. 204/98, 128, 263–266, 204/294

[56] References Cited

U.S. PATENT DOCUMENTS

| | | | |
|---|---|---|---|
| 3,223,242 | 12/1965 | Murray | 204/266 |
| 3,705,090 | 12/1972 | Bergeron et al. | 204/128 |
| 3,736,322 | 5/1973 | Helber et al. | 204/266 |
| 3,767,557 | 10/1973 | Lamm | 204/266 |
| 3,972,794 | 8/1976 | Lamm | 204/266 |
| 4,029,565 | 6/1977 | Bender et al. | 204/266 |
| 4,097,356 | 6/1978 | Yates | 204/266 |
| 4,136,005 | 1/1979 | Persson et al. | 204/266 |
| 4,229,272 | 10/1980 | Yates | 204/128 |
| 4,248,715 | 2/1981 | Olivier | 204/266 |
| 4,256,552 | 3/1981 | Sweeney | 204/98 |
| 4,260,468 | 4/1981 | Bradley | 204/266 |
| 4,290,873 | 9/1981 | Weaver | 204/128 |
| 4,308,123 | 12/1981 | Lynn | 204/266 |
| 4,361,471 | 11/1982 | Kosarek | 204/128 |
| 4,381,240 | 4/1983 | Russell | 204/128 |
| 4,411,759 | 10/1983 | Olivier | 204/128 |
| 4,439,295 | 3/1984 | Richards | 204/266 |
| 4,472,256 | 9/1984 | Hilbig | 204/266 |

FOREIGN PATENT DOCUMENTS 1323713  7/1973  United Kingdom ............... 204/266

Primary Examiner—John F. Niebling
Assistant Examiner—Terryence Chapman
Attorney, Agent, or Firm—Ronald E. Smith

[57] ABSTRACT

An electrolytic cell for generating chlorine gas and caustic and delivering only these products of the electrolytic cell to the swimming pool. The electrolytic cell is vented above the catholyte, and a catholyte overflow conduit has its inlet at an upper part of the cathode chamber, the overflow conduit being connected to a Venturi. The catholyte overflow conduit has an inlet for chlorine connected to it, which inlet is above the anolyte in the anode chamber; preferably, the chlorine inlet and the catholyte overflow conduit are joined into a single chlorine gas and catholyte outflow conduit which is connected to the Venturi. The catholyte volume is between $4\frac{1}{4}$ and $4\frac{3}{4}$ gallons. A hydrometer is provided in the cathode chamber to signal an excess strength of catholyte. The anode is of pressed carbon, having a titanium connector plug. A cation membrane is secured between an annular flange and a ring. A method of operating an electrolytic cell for delivering chlorine and sodium hydroxide to a swimming pool includes the establishment of an alkalinity in the body of water in the swimming pool of approximately 80–150 ppm.

27 Claims, 6 Drawing Figures

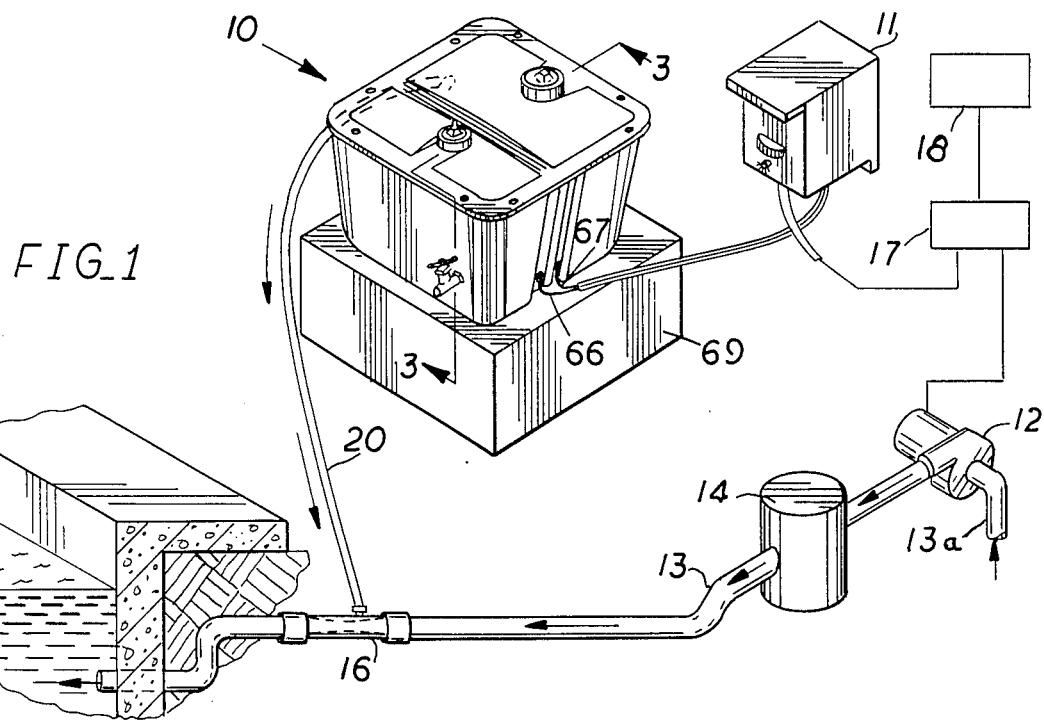
FIG_1
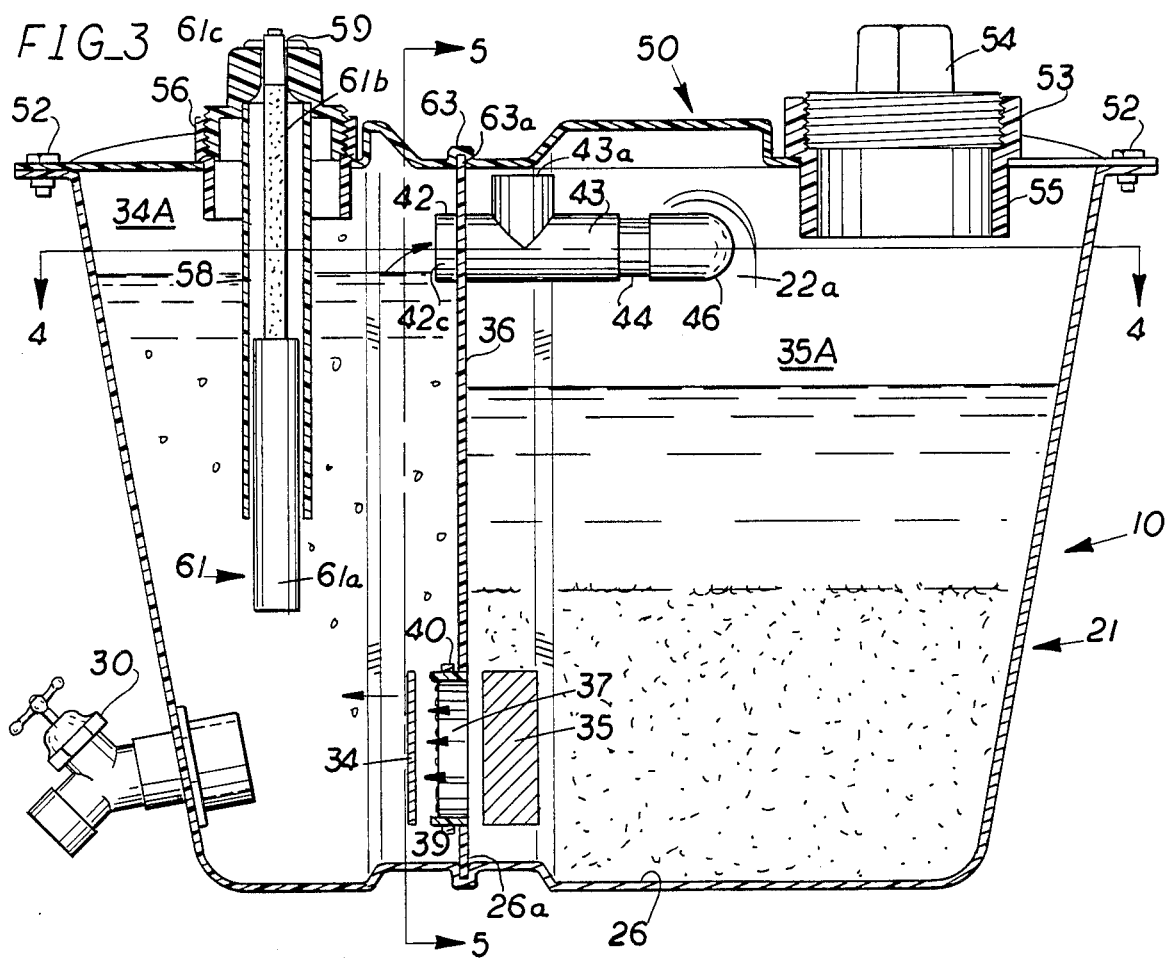
FIG_3

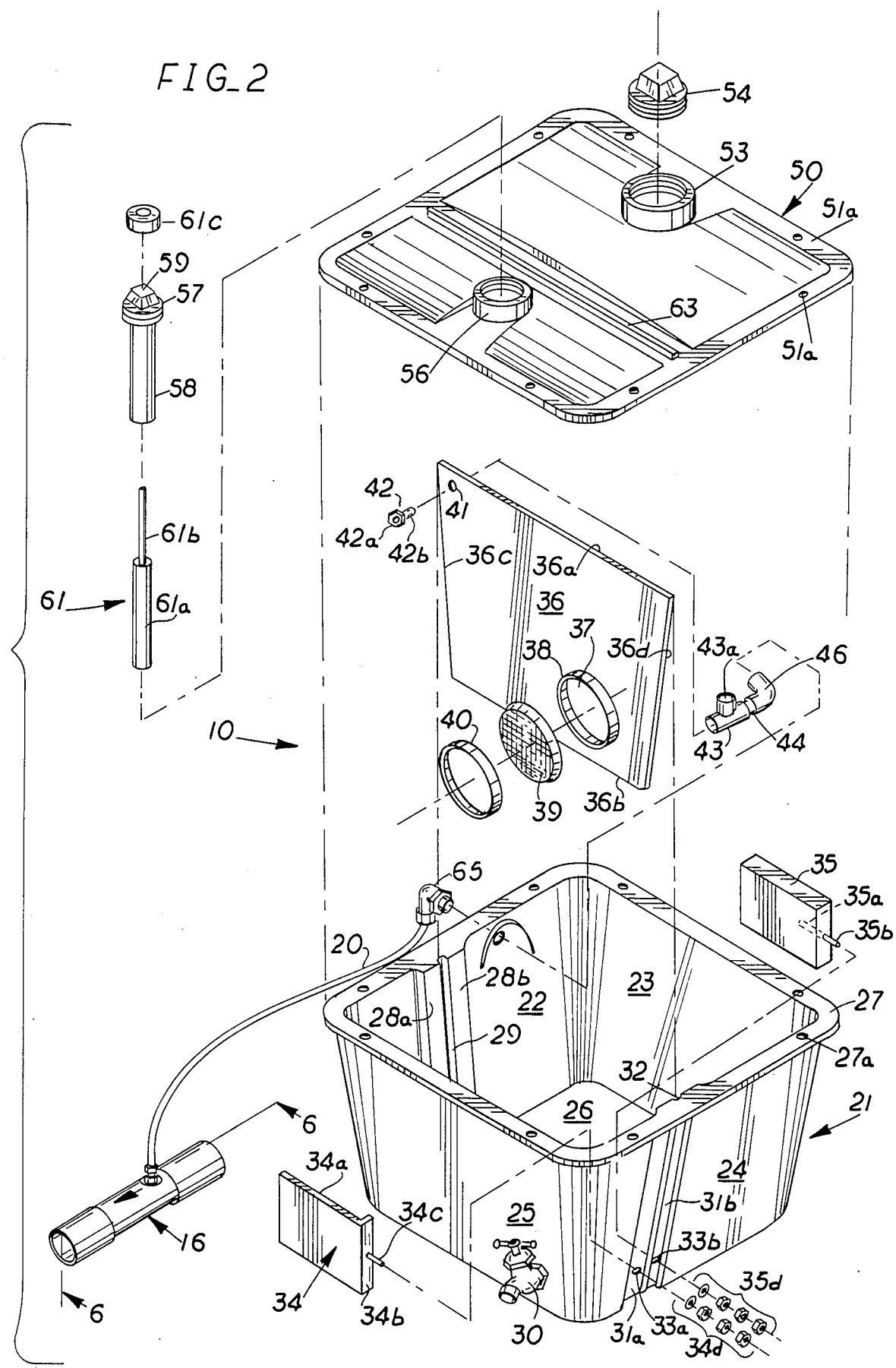
FIG_2

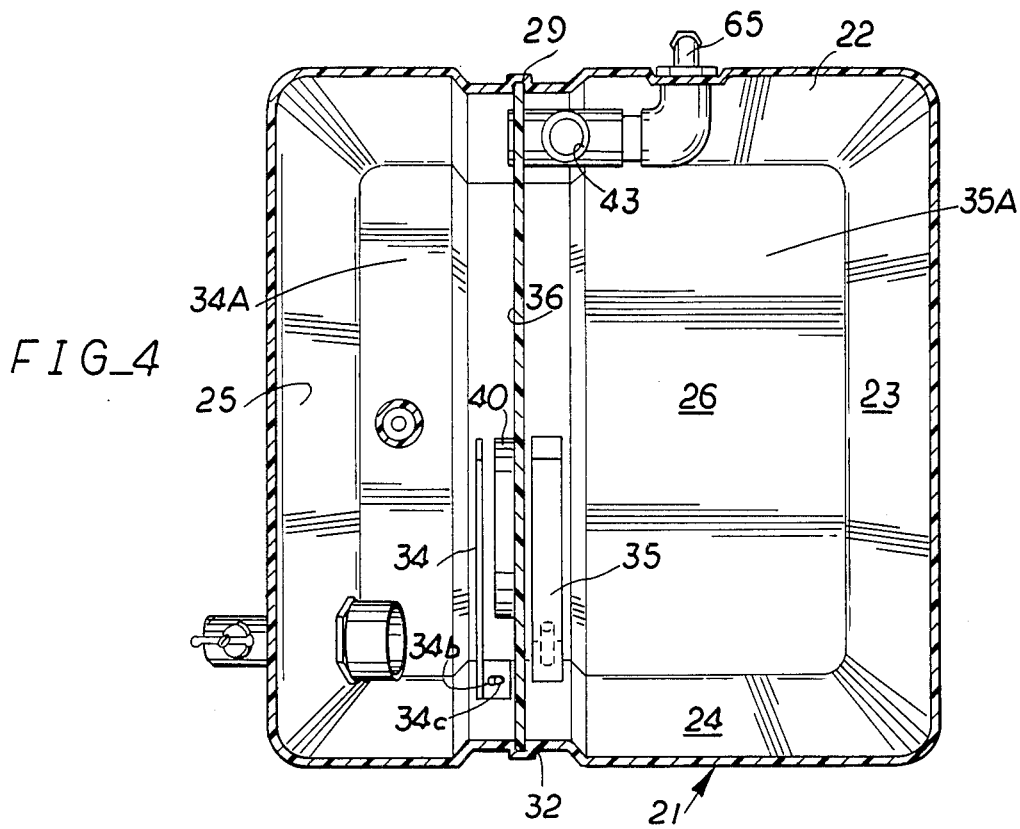
FIG_4
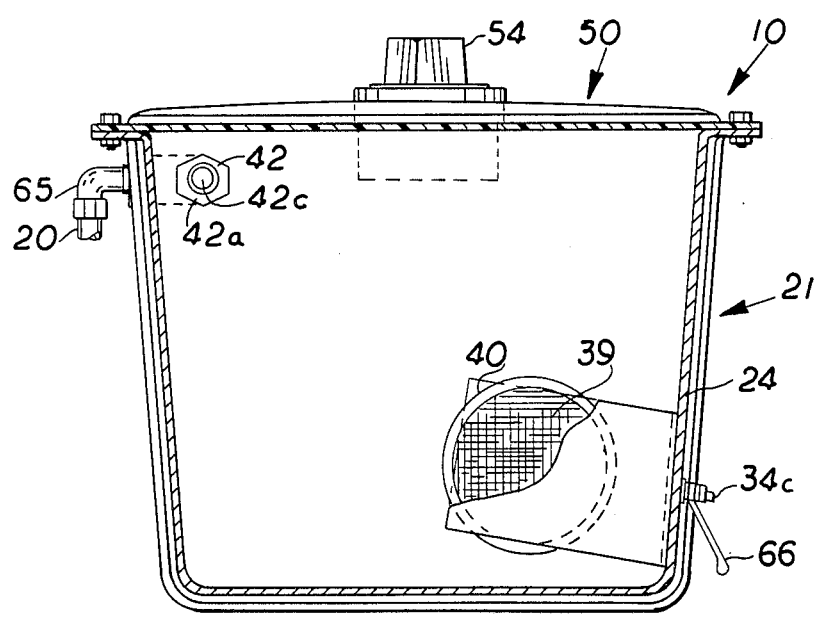
FIG_5
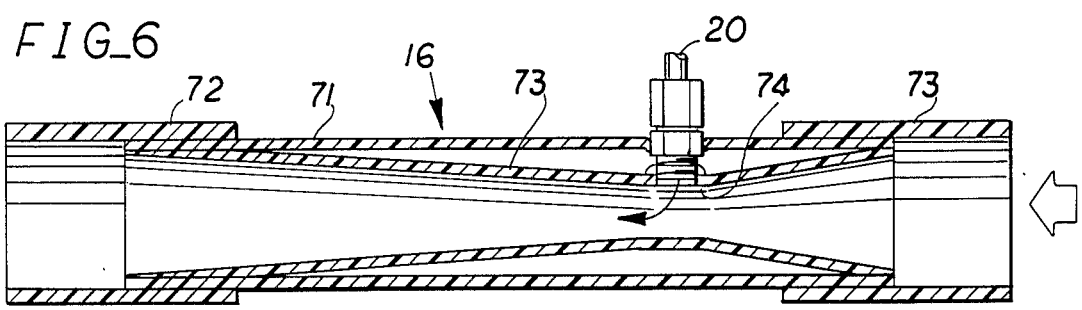
FIG_6

ELECTROLYTIC CHLORINE AND ALKALI GENERATOR FOR SWIMMING POOLS AND METHOD

BACKGROUND OF THE INVENTION

1. Field of the Invention

This invention relates to an electrolytic cell for generation of chlorine and an alkali for introduction into a swimming pool, and to a method of operating such a cell.

2. Description of the Prior Art

There have been a number of proposals for chlorinating the water in a swimming pool, or some other body of water, by generating chlorine by the electrolysis of salt water (brine). An anode and a cathode are disposed, in an anode chamber and a cathode chamber, respectively, and are separated by a wall or dam which wall or dam has an ion-permeable membrane disposed therein. The electrolysis of the brine causes disassociation of sodium and chlorine ions, thereby generating chlorine gas in the anode chamber and sodium ions which pass through the membrane into the cathode chamber. In the cathode chamber, the sodium ions combine with the water therein to form sodium hydroxide (NaOH). The sodium hydroxide is formed due to the disassociation of the water in the cathode chamber into hydrogen ions. $H(+)$ and hydroxyl ions $OH(-)$. The hydrogen ions combine with electrons from the cathode to produce hydrogen gas, which gas escapes from the liquid. The surplus hydroxyl ions combine with the sodium ions that have passed through the membrane to form sodium hydroxide. As the sodium ions pass through the membrane and into the cathode chamber to form the catholyte, sodium hydroxide, the volume of the catholyte increases. The prior art teaches that the catholyte may be disposed of either by introduction into the water of the swimming pool, or by drainage.

Patents exemplifying the above-noted state of the art include Murray Pat. No. 3,223,242 which uses an electrolytic cell for the electrolysis of a saline solution, which electrolysis generates chlorine which is delivered to a venturi which is disposed in a conduit between a pump and a swimming pool inlet. Richards et. al. Pat. No. 3,563,879 provides a cylindrical electrolytic chlorine generator having a closed, pressurized cell and in which a solution of sodium hydroxide and brine collects at the bottom of the unit, which solution is discharged through a conduit connected with a pipe leading to the swimming pool. Kirkham et. al. Pat. No. 3,669,857 provides a cell of the membrane type for the electrolysis of brine, wherein chlorine and brine are delivered to one conduit, by a bubble action, to a feed pipe to the swimming pool, and wherein sodium hydroxide and hydrogen gas are delivered through another conduit to the feed pipe. Kirkham provides a brine tank, from which brine is pumped through a filter and a medium to continuously supply the anode chamber, and a time controlled valve which is used to drain excess catholyte.

Tighe et. al Pat. No. 4,129,493 utilizes an electrolytic cell having a cation exchange membrane. Deionized water is delivered to the cathode chamber and saturated brine made from deionized water is delivered to the anode chamber. The products of electrolysis, including sodium hydroxide, hydrogen gas and water generated in the catholyte chamber and chlorine and oxygen generated in the anolyte chamber, are combined to produce sodium hypochlorite. Richards Pat. No. 4,439,295 introduces water into an electrolytic cell from the swimming pool circulator pump, and generated chlorine gas and sodium hydroxide are delivered to water returning to the swimming pool. Yates Pat. No. 4,229,272 discloses an electrolytic cell wherein chlorine and hydrogen gases are delivered to a gas feed apparatus for delivery to a swimming pool feed conduit. Yates makes no disclosure concerning the delivery of sodium hydroxide to the swimming pool.

Sweeney Pat. No. 4,256,552 provides an electrolytic chlorine generator which generates and introduces chlorine gas and hydrogen gas into a swimming pool feed pipe. Sweeney Pat. No. 4,248,681 additionally provides for the production of chlorine dioxide and mixtures of chlorine dioxide and chlorine. Sweeney Pat. No. 4,308,117 is characterized by an electrolytic cell having two membranes.

Other patents of interest include Olivier Pat. No. 4,411,759; Murray et. al. Pat. No. 3,361,663; McCallum Pat. No. 4,085,028; Coker et. al. Pat. No. 4,214,958; Kosarek Pat. No. 4,361,471; Themy Pat. No. 4,171,256 and Yates Pat. No. 4,097,356.

The known electrolytic cell chlorine generators are deficient in a number of specifics. Some do not provide for the utilization of the caustic produced by the electrolytic cell, while some utilize an unsafe pressurized cell. Many introduce into the swimming pool water all products of the electrolytic cell or more than the desired products, and are of complex construction. These devices require such items as deionizers, multiple pumps, solenoid operated valves, gas mixing stages, and may require the introduction of pool water from the circulator pump into the electrolytic cell. Moreover, the known electrolytic cells, where used in combination with swimming pools, do not provide for an interrelationship between the electrochemical action of the cell and the products produced and the alkalinity of the swimming pool water.

SUMMARY OF THE INVENTION

The present invention provides an electrolytic cell for use in generating chlorine and sodium hydroxide and for introducing only these constituents and a small amount of water, into the swimming pool water. The construction includes an overflow conduit located in an upper part of the cathode chamber which conduit is confluent with the swimming pool water, and a chlorine gas inlet from the anode chamber which inlet is positioned above the anolyte, and connected by the same conduit as the overflow conduit to a low pressure zone created by a venturi in a feed pipe of the pool pump. The catholyte chamber is vented, and the pressure in the electrolytic cell is equal to atmospheric pressure. A hydrometer indicates catholyte strength. The anode is formed of a high density carbon and has a plug of titanium therein, to which electrical connection is made, and the cathode is formed of austinitic stainless steel. A cation exchange membrane is readily replaceable by being mounted so that it extends across and along an annular flange, and is held in place by a ring passed over the flange. The size of the catholyte chamber is carefully selected so as to introduce, for an extended period of time, the proper amount of caustic or alkali into the swimming pool water. The apparatus includes a conventional power supply connected to the electrodes, a conventional membrane, a drain for the catholyte, and a single conduit for conducting both sodium hydroxide and chlorine gas to a venturi in the swimming pool feed line.

A method of operating an electrolytic cell in combination with water in a swimming pool is provided, in which the electrolytic cell products consisting essentially of chlorine gas and sodium hydroxide are delivered to a venturi or other low pressure creating region for delivering to the swimming pool, when the alkalinity of the swimming pool has been established between 80 and 150 ppm of alkali.

One of the objects of the present invention is the provision of an electrolytic cell for the generation of chlorine and caustic for introduction into a swimming pool which is of simple and reliable construction, and which is safe to operate by unskilled persons. A further object is to provide such an electrolytic cell wherein the quantity of pH control material delivered is proportional, within a limited range, to the quantity of chlorine. Still another object is to provide an apparatus for the delivery of such proportional amounts of chlorine and caustic without moving parts, and which is capable of operation over substantial periods of time. Another object is the provision of such an apparatus which does not require the utilization of expensive and complex equipment such as water deionizers, brine pumping systems and solenoid controlled valves. A further object is to provide such an electrolytic cell which is not sensitive to line pressure drops, viscosity of fluids, or the temperature or densities of fluids for its operation.

Yet another object is to provide for long-term operation of an electrolytic cell for providing chlorine and pH control material to a swimming pool by providing desired buffer or alkalinity characteristics to the swimming pool water during electrolytic cell operation.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a schematic view of an apparatus and method in accordance with the present invention, including an electrolytic cell and a part of a swimming pool with which it is used.

FIG. 2 is an exploded perspective view of an electrolytic cell in accordance with the present invention.

FIG. 3 is a cross-sectional view taken on the line 3—3 of FIG. 1.

FIG. 4 is a view taken on the line 4—4 of FIG. 3.

FIG. 5 is a cross-sectional view taken on the line 5—5 of FIG. 3

FIG. 6 is a cross-sectional view of a venturi in the feed line to the swimming pool.

DETAILED DESCRIPTION OF THE PREFERRED EMBODIMENT

Referring now to FIG. 1, an apparatus made in accordance with the teachings of the present invention is shown. The device includes an electrolytic cell 10, a support block 10a, a venturi 16, an electric power and control unit 11 and is incorporated into a system consisting of a conventional motor-driven pool circulator pump 12, a swimming pool feed line 13 having a filter 14 and said venturi 16 therein, and feed line 13 which discharges into swimming pool P. Suction line 13a is connected to the swimming pool P in a conventional manner. The electric power and control unit 11 is controlled by pool timer timer 17 which is supplied with electricity through a circuit breaker 18. A conduit 20 extends through cell 10 to venturi 16.

FIG. 2 depicts the electrolytic cell 10, which cell includes a container 21 having upwardly extending and outwardly inclined walls 22, 23, 24 and 25, a bottom wall 26, and an outwardly extending flange 27 at the upper end of the walls 22–235. Wall 22 has a boss 22a formed therein which boss has an opening 22b therethrough. Protrusions 28a and 28b extend along an project inwardly from the wall 22, and are spaced apart to provide a groove 29 between them. Similar protrusions 31a and 31b are provided in the wall 24, and define a groove 32 between them. The protrusions 31a and 31b are provided with openings 33a and 33b, respectively. A drain valve 30 is in the lower part of wall 25.

A cathode 34 formed of austinitic stainless steel includes a plate 34a, transverse mounting flange 34b and mounting screw 34c. Anode 35 is a block of high density carbon having a threaded bore 35a extending into it from an edge thereof. A threaded titanium mounting plug 35b is screwed into the bore 35a, and projects outwardly of anode 35. Conventional securing elements 34d and 35d are provided for the screw 34c and threaded plate 35b.

A divider wall or dam 36 of generally trapezoidal shape is provided and has parallel upper and lower edges 36a and 36b, respectively, and inclined side edges 36c and 36d. Divider wall or dam 36 is penetrated near lower edge 36a by a round opening 37 which is surrounded by annular flange 38. A membrane 39 has a first portion covering opening 37, and a second portion extending along the outer surface of flange 38. A securing ring 40 is provided for clamping the membrane 39 in place.

An opening 41 in dam 36 is near the juncture of side edge 36c and upper edge 36a. A hollow bolt 42 having a head 42a and a shank 42b is provided. The shank is sized to pass through opening 41, and head 42a is larger than opening 41. A tee coupling 43 receives at one end shank 42b of hollow bolt 42, and receives at the other end a pipe 44, to which an elbow 46 is joined. An opening 43a is in the stem of tee coupling 43.

A cover 50 includes a peripheral flange 51 which is shaped and sized for seating upon flange 27, which flanges have aligned holes 51a and 27a, respectively, for receiving threaded fasteners 52 (see FIG. 3). An internally threaded boss 53 extends upwardly from the cover 50, providing a filling opening which may be closed by threaded closure member 54. An internally threaded second upstanding boss 56 is provided on the cover 50 and threadedly receives a closure member 57 having a downwardly extending guide tube 58 and an opening 59 in the top thereof. A hydrometer 61 includes a float portion 61a and an indicator rod 61b which has a distinctively colored lower portion as indicated. Between the bosses 53 and 56 is a transversely extending and upwardly projecting ridge 63 having a groove 63a on its underside, as shown in FIG. 3.

FIG. 2 also depicts a fluid connector 65 in the form of an elbow, to which conduit 20 is joined, which conduit 20 extends to venturi 16.

FIGS. 3, 4 and 5 depict the electrolytic cell 10, which cell includes container 21, divider wall or dam 36 and cover 50. The lateral edges of the divider wall or dam 36, shown in FIG. 4, extend into grooves 29 and 32, and are seated in sealing relationship therewithin, secured by an appropriate adhesive. Similarly, FIG. 3, depicts a groove 26a in bottom wall 26, and an aligned groove 63a in cover 50, within which grooves the top and bottom edges of divider wall or dam 36 are seated. The cathode 34 and anode 35 are shown on either side of the divider wall 36, generally in alignment with the opening 37 therethrough. The chamber to the right of divider wall 36, as shown in FIG. 3, is the anode chamber 35A, and the chamber to the left of divider wall is the cathode chamber 34A. Boss 53 is shown with closure member 54 in place, and with a filler tube 55 extending downwardly from boss 53 into anode chamber 35A. Boss 56 has hollow closure member 57 threaded thereinto, to which guide tube 58 depends. Hydrometer 61 is housed within tube 58 and includes rod 61b on float 61a. A small portion of rod 61b, near its upper end, is of one one color, whereas the lower portion thereof is of another color, preferably red. The diameter of rod 1b is less than the diameter of opening 59, thereby providing an atmospheric vent. Mounted in divider wall 36 is tee bolt 42, tee coupling 43, pipe 44 and elbow 46, which elbow extends to boss 22 and thereby brings the interior of the conduit formed by these elements into fluid communication with the connector 65 and conduit 20, as shown in FIG. 5. As shown in FIG. 4, the upper end of the stem portion of tee 43 is open, providing an inlet opening 43a thereinto. The inlet opening 43a is for chlorine gas and is positioned above the anolyte in anode chamber 35A. FIGS. 3 and 5 depict an opening 42c formed in hollow bolt 42, which opening is an overflow opening for the catholyte in cathode chamber 34A. FIG. 4 depicts the head of screw 34c, which extends through flange 34b of cathode 34. Screw 34c is shown in FIG. 5 extending through wall 24 of container 21 and having electrical conductor 66 secured thereon by securing elements 34d. Conductor 66 is also shown in FIG. 1, together with electrical conductor 67, which is secured to threaded plug 35b of anode 35 by securing elements 35d.

FIG. 6 shows venturi 16 which includes a straight central tube 71 having telescoped cylindrical end fittings 72 and 73. Tube 71 includes a converging-diverging tube 73 having a throat portion 74 to which is connected conduit 20. Throat area 74 is at a reduced pressure when water flows through it, thereby providing suction through conduit 20.

Substantially all of the parts of the electrolytic cell 10 are formed of plastic material, the exceptions being the cathode 34 and anode 35. Thus, all parts resist the harmful effects of the substances placed in and generated by electrolytic cell 10, which substances include brine, hydrogen, chlorine, and sodium hydroxide. Membrane 39 has a diameter of approximately 3½", and as shown in FIGS. 3, 4, and 5, in particular, anode 35 and cathode 34 are sized to "cover" membrane 39. Membrane 39 is preferably a Teflon type material which is known as "DuPont 324" and which is manufactured by DuPont.

A significant feature of the present invention is the volume of catholyte in the cathode chamber, which volume is determined by the physical dimensions of the cathode chamber and, in combination therewith, the position of overflow opening 42c relative to bottom 26. Openingly 41 is positioned relative to bottom 26 to provide a catholyte volume of approximately 4½ gallons plus or minus ¼ gallon.

Before beginning operation of the novel apparatus, the pH of the pool water should be between 7.4 and 7.8, the chlorine concentration should be no less than 1.5 ppm, a stabilizer such as cyanuric acid should be present in a concentration between 30-80 ppm, and the total alkalinity should be between 80 and 150 ppm. The anode chamber 35A is charged with 40 pounds of pelletized common salt. Water is introduced through the filling opening provided by boss 53 until its level reaches the bottom of filler tube 55. The anode chamber 35A is then closed by closure plug 54 and water is introduced into cathode chamber 34A until it overflows through opening 42a. The cathode chamber is closed, pump 12 is started, and electricity is supplied to cathode 34 and anode 35 by power and control unit 11, which supplies positive and negative direct current voltage to the electrodes. Disassociation activity occurs primarily between cathode 34 and anode 35, which members are spaced apart approximately 1⅛".

As the unit operates, sodium chloride disassociates to form chlorine gas and sodium ions. The sodium ions pass through cation exchange membrane 39, in a continuous manner. At the same time and also within the cathode chamber, water disassociates into hydrogen ions and hydroxyl ions. The hydroxyl ions combine with the sodium ions to form sodium hydroxide. p Electrolytic cell 10 works on a batch process. Accordingly, early in the batch life the concentration of sodium hydroxide in the cathode chamber is relatively weak. Meanwhile, the cell is generating chlorine gas, which gas enters the pool water by being drawn from the part of the anode chamber 35A which is above the level of the anolyte, entering the chlorine inlet 43a. The space above the anolyte in anode chamber 35A and the space above the catholyte in cathode chamber 34A are at substantially atmospheric pressure, due to the vent provided by the difference in a diameter of hydrometer rod 61b and opening 59 in closure member 57 through which rod 61b extends. Fluid communication between the upper part of cathode chamber 34A and anode chamber 35A is provided by hollow bolt 42 and tee connection 43. Consequently, chlorine gas under suction from venturi 16 enters chlorine inlet 43a, and the conduit provided by tee connection 43, pipe 44, elbow 46, connector 65 and conduit 20. As the quantity of the catholyte continues to increase as a result of the migration of sodium ions and water through membrane 39, the catholyte overflows through catholyte overflow opening 42c, and flows through the bore of hollow bolt 42 into the left extension of tee coupling 43. The catholyte conduit is formed, also, by the other arm of tee coupling 43, pipe 44, elbow 46, connector 65 and conduit 20. The flow of atmospheric air into cathode chamber 34A through the vent, and to venturi 16 carries the overflowing sodium hydroxide along the above-noted conduit to venturi 16. Support block 10a elevates cell 10 to supplement the venturi suction with a gravity head.

The catholyte has a relatively low concentration of sodium hydroxide in the early stages of electrolysis. The catholyte is initially water and becomes a sodium hydroxide solution of gradually increasing strength as the electrolysis continues. As a consequence, very little alkali is introduced into catholyte overflow conduit 42, 43, etc., in the early stage of the batch life. Meanwhile, a substantial amount of chlorine gas is being generated and added to the swimming pool water through venturi 16, which gas forms hypochlorous acid when reacted with water. This reduces the pH of the pool water.

However, in a pool where the total alkalinity has been established as aforesaid, the surplus hydrogen ions will be absorbed. Thus, the alkalinity control acts as a buffer means. During this middle of the batch life, the concentration of sodium hydroxide in the catholyte is substantially greater, and as the catholyte overflows, a greater amount of caustic is thereby added to the water of the swimming pool. At this stage of the batch life, the amount of caustic added to the swimming pool is adequate to completely compensate for the hypochlorous acid being formed by the chlorine. Thus, during this stage, the alkalinity control in the swimming pool is passive. In the latter part of the batch life, the concentration of the sodium hydroxide is higher than required to compensate for the hypochlorous acid, and at this stage the alkalinity control in the swimming pool water releases hydrogen ions which were absorbed during the early stages of the batch life. This action over the batch life maintains an appropriate pH level in the swimming pool water over a substantial period of time, without the use of sensors, servomechanisms, automatic control valves, and the like. The automatic or inherent control of the pH is achieved by controlling the total alkalinity of the swimming pool water and by controlling the concentration range of the catholyte, which control is provided by the established volume of catholyte in cathode chamber 34A.

The catholyte volume in the cathode chamber is substantially independent of the number and sizes of the electrodes, their spacing and of the size of the membrane. The amount of pH lowering sodium hydroxide generated in the electrolytic cell is generally proportional to the amount of pH raising chlorine gas generated, so that over a batch life, the pH level of the pool water remains within acceptable limits.

Towards the end of the batch life, the specific gravity of sodium hydroxide in the catholyte rises to approximately 1.2. The density of the catholyte acts to elevate the float 61a and rod 61b of the hydrometer 61 so that the lower colored portion of rod 61b is visible. This warns the pool owner that the batch life is at its end The pool owner discards the catholyte by opening valve 30, and prepares a new batch.

Cell 10 is effective with swimming pools ranging in size from 7,000 gallons to 50,000 gallons. Chlorine loss is dependent upon weather conditions, number of swimmers and other factors. Tests of the novel apparatus have shown that operation of electrolytic cell 10 for 4-8 hours per day is adequate for swimming pools of smaller size (7,000-15,000 gallons), while swimming pools of larger size (40,000-50,000 gallons) may require continuous 24 hour operation to maintain the chlorine at the desired level.

Membrane 39 may be easily replaced by removing cover 50 and ring 40, after which a new membrane is installed. Cathode 34 and anode 35 may also be replaced by untrained personnel.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, we claim:

1. An apparatus including an electrolytic cell for the electrolysis of a metallic chloride salt solution for generating chlorine and caustic for introduction into swimming pool water and having conduit means for connecting the electrolytic cell and pool water, the electrolytic cell having an anode chamber with an anode and anolyte therein, a cathode chamber with a cathode and a catholyte therein and wall means for separating the chambers wherein the improvement comprises:

an overflow conduit means for conducting caustic from the cathode chamber of said electrolytic cell to swimming pool water, said overflow conduit means having an inlet for caustic in an upper portion of said cathode chamber, a means for conducting only chlorine gas from the anode chamber of said electrolytic cell to pool water and having a chlorine inlet above and spaced from the anolyte in said anode chamber, a connecting means fluid-connecting said chloride inlet to said overflow conduit means, said connecting means being positioned downstream of said caustic inlet, and said overflow conduit means extending through said wall means from said cathode chamber to said anode chamber, and said chlorine inlet connected to said conduit in said anode chamber.

2. An apparatus as set forth in claim 1, wherein catholyte in said cathode chamber occupies a volume of about $4\frac{1}{4}$ to $4\frac{1}{2}$ gallons.

3. The apparatus as set forth in claim 2, further comprising means for indicating a predetermined strength of the catholyte.

4. The apparatus as set forth in claim 1, further comprising means for indicating a predetermined strength of the catholyte.

5. The apparatus as set forth in claim 4, said indicating means comprising means for indicating a strength of the catholyte of approximately 20%.

6. The apparatus as set forth in claim 4, said indicating means comprising a hydrometer.

7. The apparatus as set forth in claim 6, said electrolyte cell having a cover over the cathode chamber, said cover having a guide tube extending downwardly therefrom and opening therethrough, and a float having a portion thereof extending in said guide tube and through said opening when said catholyte has reached a predetermined strength.

8. The apparatus as set forth in claim 4, further comprising valve means for draining catholyte from said cathode chamber.

9. An apparatus as set forth in claim 1, wherein said electrolyte cell has a cover, and wherein means securing said cover to said cell are provided, together with a pool water circulating means including a conduit having a pump and a venturi therein, wherein said overflow conduit means and said chlorine gas conducting means are in direct fluid communication with said venturi, wherein a filling opening in said cover into each said chamber of said electrolytic cell is provided, each filling opening having a removeable closure member, and wherein said electrolytic cell is penetrated only by a discharge conduit in said cathode chamber having a valve therein, a vent, said conduit means and by electrical conductors for said anode and cathode.

10. The apparatus as set forth in claim 1, wherein said anode is of high density carbon and has a plug of titanium therein which extends therefrom.

11. The apparatus as set forth in claim 10, further comprising a current conductor connected to said titanium plug.

12. The apparatus as set forth in claim 1, said electrolytic cell comprising an opening through said wall means having a flange transverse to said wall means, a cation membrane extending across and along said flange, and annular means encircling said flange for securing said membrane thereon.

13. The apparatus of claim 1, wherein said cathode is formed of stainless steel.

14. An apparatus for supplying chlorine and caustic to water for purification thereof comprising:
   an electrolytic cell comprising a substantially closed housing, divider wall means in said housing for separating said cell into an anode chamber with an anode therein and a cathode chamber with a cathode therein, an opening through said wall means, a cation membrane across said opening,
   said cathode chamber having a catholyte overflow conduit extending from an upper part thereof, and having a vent above said overflow conduit,
   means for connecting said overflow conduit with a body of water,
   said anode chamber having a chloride gas outflow conduit extending therefrom, a chlorine inlet into said outflow conduit located above said anolyte in said anode chamber,
   means for connecting said chlorine gas outflow conduit with said body of water, and
   said catholyte overflow conduit extending through said wall means from said cathode chamber to said anode chamber, and said chlorine inlet connected to said overflow conduit in said anode chamber.

15. The apparatus of claim 14, wherein the means for bringing said catholyte overflow conduit and said chlorine gas outflow conduit into fluid communication with one another comprises an overflow conduit connecting means and an outflow conduit connecting means which comprises a single conduit.

16. The apparatus of claim 15, said body of water comprising a region of pressure lower than atmospheric, said single conduit being connected thereto for withdrawing chlorine and catholyte from said electrolytic cell.

17. The apparatus of claim 14, wherein said housing has filling openings formed therein for each of said chambers, a removable closure member for each of said chambers, and valve means for draining catholyte from said cathode chamber.

18. A method of adding chlorine and sodium hydroxide to a body of water such as a swimming pool comprising the steps of:
   providing an electrolytic cell having an anode chamber and a cathode chamber containing an anode and a cathode, respectively, and having a cation membrane therebetween,
   providing an aqueous metallic chloride salt solution in said anode chamber,
   providing water in said cathode chamber,
   establishing the alkalinity of said body of water between approximately 80 and 150 parts per million of an alkali,
   providing a region of lower than atmospheric pressure in communication with said body of water,
   providing a vent in said electrolytic cell in communiction with said anode chamber,
   generating chlorine gas in said anode chamber and hydrogen gas and sodium hydroxide in said cathode chamber by supplying electricity to said anode and cathode,
   forming an opening between the cathode chamber and the anode chamber at a point that is a predetermined distance above the level of the respective solutions therein before said electricity is applied,
   collecting overflowing sodium hydroxide in an overflow conduit means,
   positioning said overflowing conduit means so that it extends through said opening and into said anode chamber,
   providing an outflow conduit means that collects chlorine gas generated in said anode chamber, and
   forming from said overflow conduit means and said outflow conduit means a single conduit that delivers only chlorine gas, air and sodium hydroxide to said region from said electrolytic cell.

19. The method of claim 18, further comprising the step of monitoring the specific gravity of the catholyte.

20. The method of claim 19, further comprising the step of draining hydroxide from said electrolytic cell upon said specific gravity reaching approximately 1.2.

21. The method of claim 18, further comprising the step of venting hydrogen gas from said electrolytic cell.

22. The method of claim 18, further comprising the step of providing a catholyte chamber having a volume of approximately $4\frac{1}{4}$ to $4\frac{3}{4}$ gallons.

23. An apparatus for supplying chlorine and sodium hydroxide to swimming pool water for purification thereof comprising,
   an electrolytic cell comprising a substantially closed housing, divider wall means in said housing for separating said cell into an anode chamber with an anode therein and a cathode chamber with a cathode therein, an opening through said wall means, a cation membrane across said opening,
   said cathode chamber having a catholyte overflow conduit extending from an upper part thereof, and having a vent above said overflow conduit,
   said anode chamber having a chlorine gas outflow conduit extending therefrom,
   said cathode chamber having means limiting the catholyte volume to between approximately $4\frac{1}{4}$ and $4\frac{3}{4}$ gallons,
   said means limiting said catholyte volume provided in the form of an opening formed in said wall means and predetermined distance above the level of said catholyte, and a catholyte overflow conduit positioned within said opening which carries catholyte in excess of said volume out of said cathode chamber.

24. The apparatus as set forth in claim 23, wherein said cation membrane has a diameter of approximately $3\frac{1}{2}''$.

25. An apparatus for supplying chlorine and sodium hydroxide to swimming pool water for purification thereof comprising,
   an electrolytic cell comprising a substantially closed housing, divider wall means in said housing for separating said cell into an anode chamber with an anode therein and a cathode chamber with a cathode therein, an opening through said wall means, a cation membrane across said opening,
   said cathode chamber having an overflow conduit extending therefrom, means for indicating the strength of catholyte in said cathode chamber, said anode chamber having a chlorine gas outflow conduit extending therefrom, and said overflow and outflow conduits forming a single conduit exteriorly of said cathode chamber and interiorly of said anode chamber.

26. The apparatus as set forth in claim 25, wherein said indicating means is a hydrometer.

27. The apparatus as set forth in claim 26, wherein said hydrometer includes an indicating rod that extends outwardly of said housing.

* * * * *